(12) United States Patent
Song et al.

(10) Patent No.: US 7,899,088 B2
(45) Date of Patent: Mar. 1, 2011

(54) APPARATUS AND METHOD FOR RECEIVING MULTIPLE STREAMS IN A MOBILE BROADCAST SYSTEM

(75) Inventors: Young-Joo Song, Suwon-si (KR);
Ki-Ho Jung, Gwacheon-si (KR);
Young-Kwon Lim, Goyang-si (KR);
Je-Chang Jeong, Seoul (KR);
Kook-Heui Lee, Yongin-si (KR)

(73) Assignees: Samsung Electronics Co., Ltd., Suwon-si (KR); Industry-University Cooperation Foundation Hanyang University, Seoul (KR)

( * ) Notice: Subject to any disclaimer, the term of this patent is extended or adjusted under 35 U.S.C. 154(b) by 586 days.

(21) Appl. No.: 11/581,082

(22) Filed: Oct. 16, 2006

(65) Prior Publication Data

US 2007/0091912 A1    Apr. 26, 2007

(30) Foreign Application Priority Data

Oct. 14, 2005  (KR) ............... 10-2005-0097240
Jan. 11, 2006  (KR) ............... 10-2006-0003338

(51) Int. Cl.
*H04J 3/04* (2006.01)
(52) U.S. Cl. ............... 370/536; 370/417
(58) Field of Classification Search ............... 370/536, 370/509; 375/240.08; 348/578
See application file for complete search history.

(56) References Cited

U.S. PATENT DOCUMENTS

| | | | |
|---|---|---|---|
| 6,175,595 B1 | 1/2001 | Keesman | |
| 7,199,836 B1 * | 4/2007 | Eleftheriadis et al. | 348/578 |
| 2002/0003845 A1 | 1/2002 | Kamiya | |
| 2003/0048853 A1 | 3/2003 | Oh et al. | |
| 2003/0163781 A1 | 8/2003 | Visharam et al. | |
| 2003/0229900 A1 | 12/2003 | Reisman | |
| 2004/0066846 A1 * | 4/2004 | Yun et al. | 375/240.08 |
| 2005/0226196 A1 | 10/2005 | Suh | |
| 2007/0093263 A1 * | 4/2007 | Song et al. | 455/556.1 |
| 2009/0003389 A1 * | 1/2009 | Joung et al. | 370/509 |

FOREIGN PATENT DOCUMENTS

| | | |
|---|---|---|
| JP | 10-150654 A | 6/1998 |
| KR | 1020010083460 A | 1/2001 |
| KR | 1020010083459 A | 9/2001 |
| KR | 1020040088526 A | 10/2004 |
| RU | 2154357 C2 | 8/2000 |
| RU | 2001104353 A | 1/2003 |
| WO | WO 98/36559 A1 | 8/1998 |
| WO | WO 01/50773 A1 | 7/2001 |
| WO | WO-0150773 A1 | 7/2001 |
| WO | WO-2007061184 A1 | 5/2007 |

* cited by examiner

*Primary Examiner* — Albert T Chou
(74) *Attorney, Agent, or Firm* — Roylance, Abrams, Berdo & Goodman, L.L.P.

(57) ABSTRACT

An apparatus and method are provided for receiving multiple streams. A group session structure is defined and streams are decoded according to the defined group session structure so that a single decoder can sequentially process demultiplexed streams allocated to multiple decoding buffers when multiple logical media streams are multiplexed into one physical stream in a mobile broadcast communication system based on Lightweight Application Scene Representation (LASeR).

10 Claims, 9 Drawing Sheets

FIG.1

(CONVENTIONAL ART)

FIG.2

(CONVENTIONAL ART)

APPARATUS AND METHOD FOR RECEIVING MULTIPLE STREAMS IN A MOBILE BROADCAST SYSTEM

CROSS-REFERENCE TO RELATED PATENT APPLICATIONS

This application claims the benefit under 35 U.S.C. §119(a) of Korean Patent Applications filed in the Korean Intellectual Property Office on Oct. 14, 2005 and Jan. 11, 2006 and assigned Ser. Nos. 2005-97240 and 2006-3338, respectively, the entire disclosure of both of which are hereby incorporated by reference.

BACKGROUND OF THE INVENTION

1. Field of the Invention

The present invention generally relates to a mobile broadcast system. More particularly, the present invention relates to a multi-stream reception apparatus and method for receiving data streams based on Lightweight Application Scene Representation (LASeR).

2. Description of the Related Art

Lightweight Application Scene Representation (LASeR) is a format of multimedia content for a simple multimedia service in terminals such as mobile phones suffering from resource shortages. The LASeR may be a sub-set of a Moving Picture Experts Group-4 Binary Format for Scene (MPEG-4 BIFS). The BIFS is a scene description standard for all multimedia contents and the LASeR is a scene description standard for multimedia terminals such as mobile phones in which a display size and a network bandwidth are small.

The BIFS is used for an object-based system. In the object-based system, multimedia is a set of objects. Accordingly, temporal and spatial information of each of the media needs to be indicated. For example, in the case of a weather forecast, four objects such as a weather caster, a weather chart displayed behind the weather caster, speech of the weather caster, and background music can be considered. When multiple objects are present independently, an appearing time, disappearing time and position of each object should be defined to describe one scene. This definition is the BIFS. Because related information is stored in a binary file according to the BIFS, the storage capacity is reduced.

However, the BIFS has a large amount of data of about 200 pages as described in the MPEG-4 system standard document (International Organization for Standardization/International Electro-technical Commission (ISO/IEC) 14496-1). Thus, in communication environments suffering from the shortage of available resources as in mobile terminals, there is a difficulty in using the BIFS. An alternative plan is to use the LASeR. The LASeR is the technology developed for free representations of various multimedia and interactions with users in mobile terminals with limited memory and power by performing multiplexing and synchronization processes for different elementary streams (ESs) such as a LASeR scene description, video, audio, image, font, and metadata, and minimizing complex requirements. The ESs have the above-described generic meaning. Herein, the ESs are considered as individual logical channels configuring multiple channels to be displayed.

The LASeR ES is constructed with an access unit (AU) including a command. The command is used to change a scene characteristic at a particular time. Simultaneous commands are grouped in one AU. The AU may be one scene image, short sound, one graphic image, or short animation. The commands are Insert, Replace, Delete, Background, Save, Clean, and the like. The LASeR may be referred to as the standard needed to express a commercial film (CF) in which images vary with very complex elements. A LASeR browser displays ESs in designated order. The hierarchy is present between the ESs. The LASeR browser displays scenes in order of: (1) packet reception, (2) packet decoding (AU-by-AU recovery of one image, one video clip, and the like), (3) command execution, (4) audio/video object rendering, (5) user interaction (selection, dragging, and the like), and (6) local connection or connection with an external information source.

Figure 1:
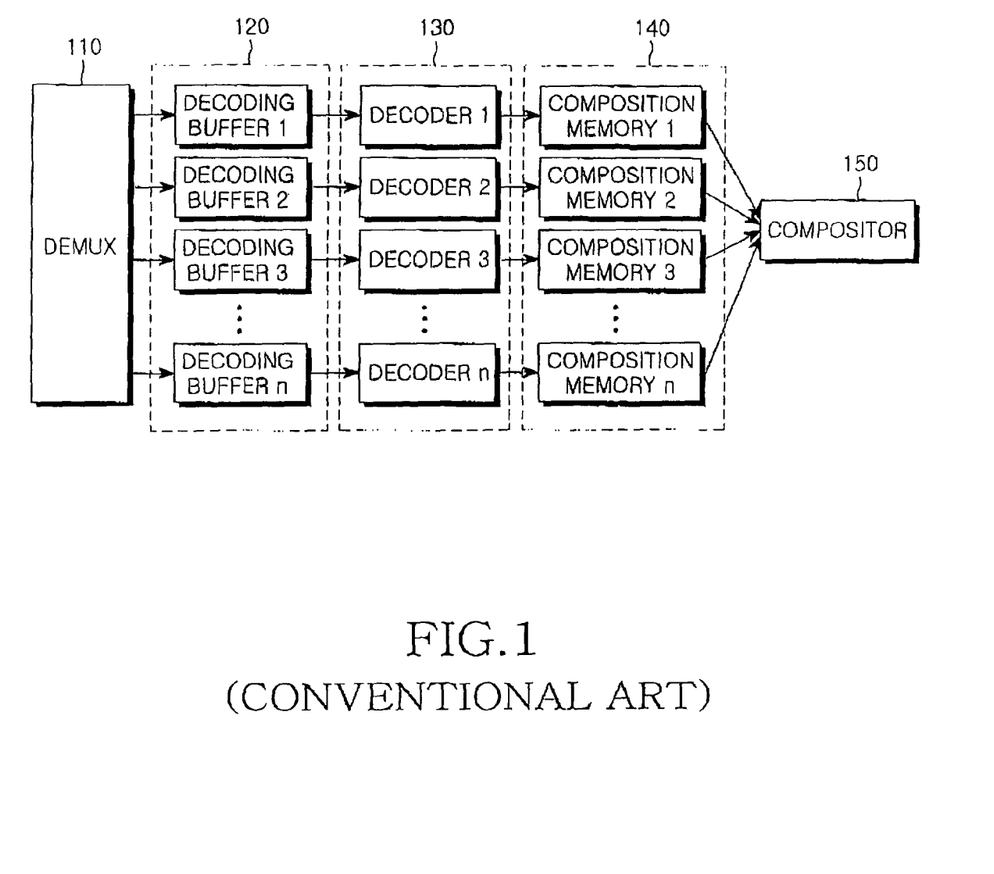
FIG. 1 illustrates a decoder model of a conventional Moving Picture Experts Group-4 (MPEG-4) system.

FIG. 1 illustrates a decoder model of an MPEG-4 system to which the LASeR is applied.

Referring to FIG. 1, a demultiplexer 110 of a mobile terminal demultiplexes multiplexed logical channels on which data streams are transmitted from a service provider through a predetermined communication network. The multiplexed logical channels are divided and stored in decoding buffers 120 and are decoded by decoders 130. Decoded media are stored in composition memories 140. A compositor 150 displays the stored decoded media on a screen. To simultaneously decode the channels, the decoder model of FIG. 1 should be provided with the decoding buffers 120 for the streams, the decoders 130, and the composition memories 140. However, when the decoding buffers 120, the decoders 130, and the composition memories 140 are provided on a stream-by-stream basis, it is difficult for resources to be secured because the mobile terminal is a narrow-bandwidth communication medium.

Figure 2:
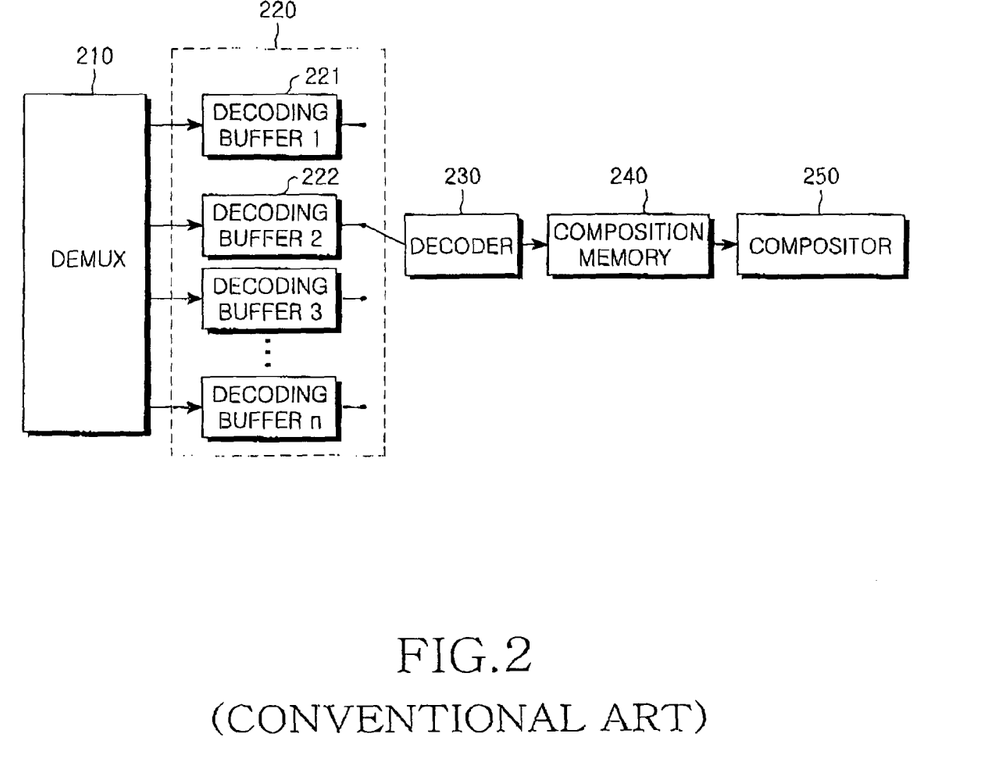
FIG. 2 illustrates a decoder model of a conventional terminal.

FIG. 2 illustrates a decoder model of a mobile terminal for addressing the problem as described with reference to FIG. 1.

Figure 3:
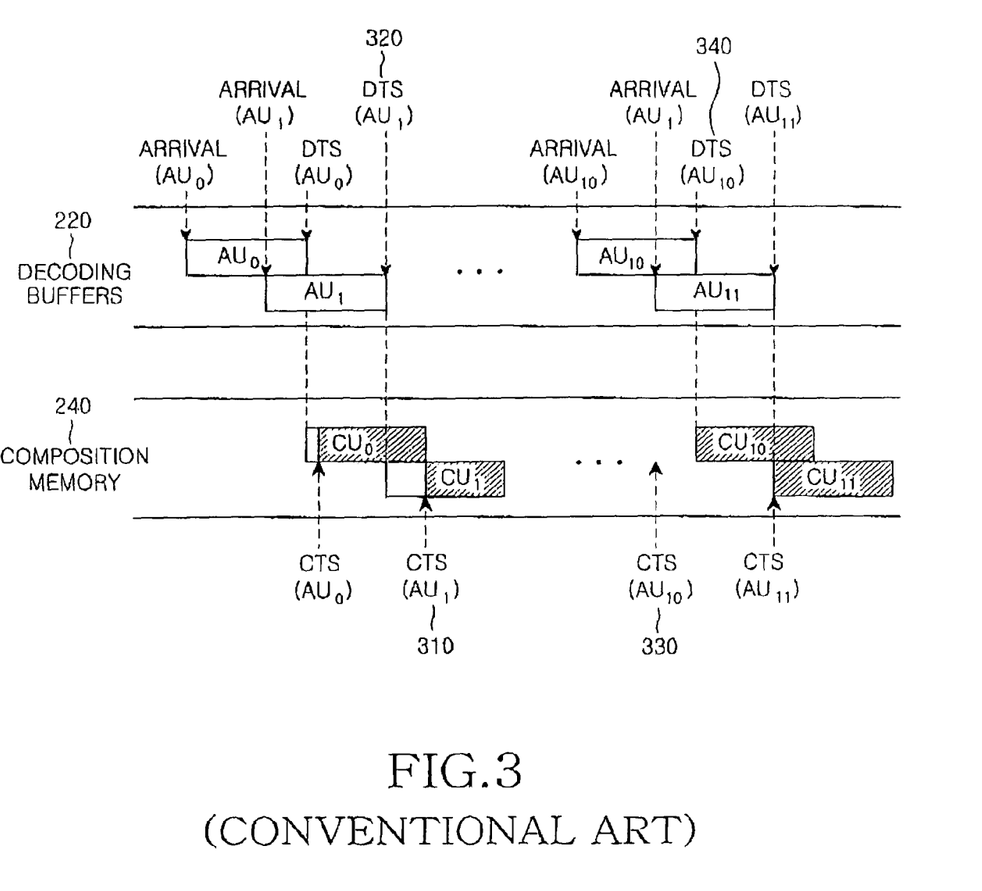
FIG. 3 illustrates a decoder model according to a conventional decoding time stamp (DTS) and composition time stamp (CTS)

In FIG. 2, a demultiplexer 210, decoding buffers 220, a single decoder 230, a single composition memory 240 and a compositor 250 are provided. When the single decoder 230 and the single composition memory 240 are provided, the decoder 230 sequentially accesses and decodes data of a decoding buffer 221 during a predetermined time. When the decoding operation for the decoding buffer 221 ends, the decoder 230 repeats an operation for accessing the next decoding buffer (for example, a decoding buffer 222). In this case, a problem will be described with reference to a system decoder model according to a decoding time stamp (DTS) and a composition time stamp (CTS) of FIG. 3. FIG. 3 illustrates the decoder model according to the conventional DTS and CTS.

In FIG. 3, the DTS stands for a time stamp indicating the time at which the decoding operation ends and the CTS stands for a time stamp indicating the time at which decoded media are displayed on the mobile terminal. Because the DTS and CTS information is basic information at the time of video coding, the mobile terminal can detect the DTS and CTS information at a decoding time.

Because the single decoder 230 sequentially processes data of multiple decoding buffers 220, a problem may occur when the decoding buffers 220 are managed.

First, when the DTS is equal to the CTS, decoded media can be displayed through a compositor 250 at an appropriate time. However, when a CTS 310 is later than a DTS 320 (that is, DTS(AU1) 320<CTS(AU1) 310), the decoded media cannot be displayed during a predetermined time. In contrast, when a CTS 330 is earlier than a DTS 340 (that is, DTS(AU10) 340>CTS(AU10) 330), decoded media capable of being displayed are absent in a composition memory 240 during a predetermined time and therefore the decoded media cannot be displayed.

Figure 4:
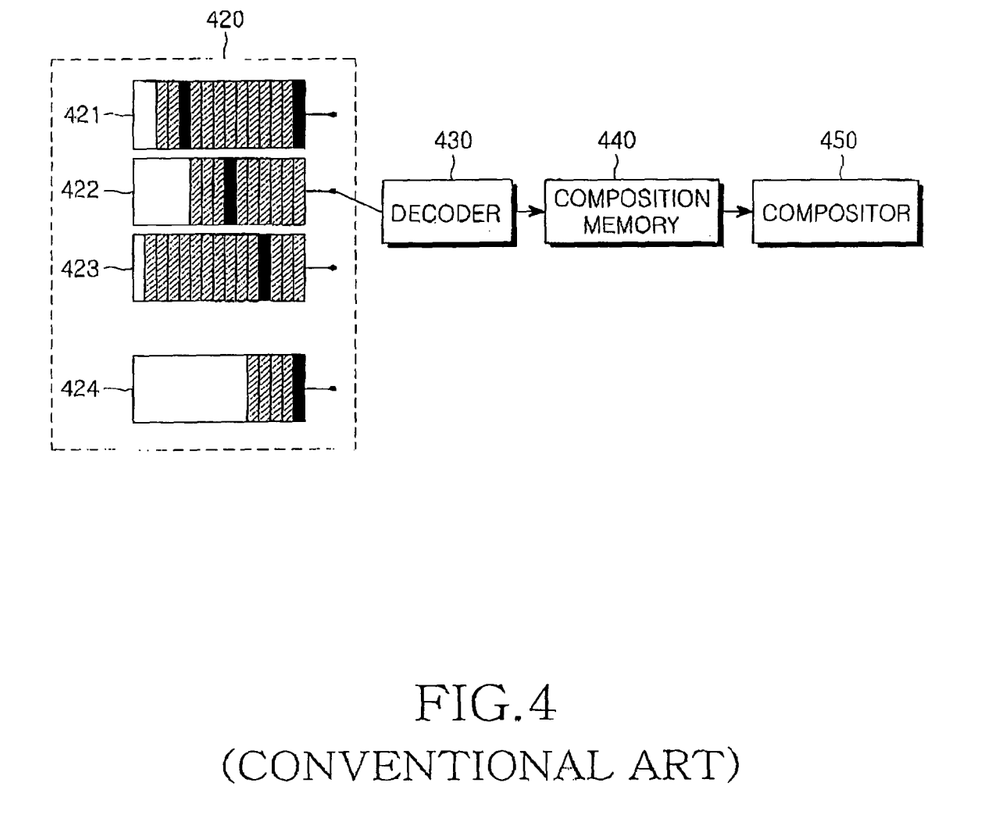
FIG. 4 illustrates states of decoding buffers when a single decoder is used.

FIG. 4 illustrates states of decoding buffers when a single decoder and a single composition memory are used.

The decoder 430 sequentially accesses and decodes data of each of the decoding buffers 420 during a predetermined time and repeats an operation for accessing the next decoding buffer. The data is stored in a composition memory 440 and a compositor 450 displays the stored decoded data. A frame indicated by a black box is a frame (for example, I-frame) capable of being immediately decoded in each stream. When the decoder 430 accesses an arbitrary buffer, the frame capable of being immediately decoded in the decoding buffers 420 may not be placed in an access point, that is, a front end thereof. In this case, there is a problem in that an unnecessary delay time occurs until the frame capable of being immediately decoded is placed in a front end of the decoding buffers 420.

Accordingly, there is a need for an improved apparatus and method for receiving multiple streams in a mobile broadcast system that prevents a delay in time of a frame to be placed in a front end of decoding buffers.

SUMMARY OF THE INVENTION

An aspect of exemplary embodiments of the present invention is to address at least the above problems and/or disadvantages and to provide at least the advantages described below. Accordingly, an aspect of exemplary embodiments of the present invention is to provide an apparatus and method for receiving multiple streams in a mobile broadcast system that can efficiently decode multiple logical streams.

It is another aspect of exemplary embodiments of the present invention to provide an apparatus and method for receiving multiple streams in a mobile broadcast system that can efficiently manage multiple decoding buffers.

It is another aspect of exemplary embodiments of the present invention to provide an apparatus and method for receiving multiple streams in a mobile broadcast system that can provide information needed for a decoder operation to configure multiple channels on a screen without a special mosaic channel and that can configure decoder level information different from screen information to prevent a confusion between system layers.

It is yet another aspect of exemplary embodiments of the present invention to provide an apparatus and method for receiving multiple streams in a mobile broadcast system that can reduce a waiting time due to channel switching by configuring logical buffers whose number is equal to the number of grouped streams and that can efficiently manage and decode buffer data according to session structure information of buffers.

In accordance with an aspect of exemplary embodiments of the present invention, there is provided a method for receiving multiple streams in a mobile broadcast system, in which multiplexed logical channels on which data streams are transmitted are received and demultiplexed from a service provider to a mobile terminal through a predetermined communication network, the demultiplexed logical channels are allocated to decoding buffers by referring to a group session structure defined by the service provider, a decoding time is computed at which a single decoder sequentially accesses and decodes data of the decoding buffers by referring to the group session structure and performing a decoding operation at the computed decoding time, decoded channel-by-channel elementary streams are stored in a memory, and the decoded channel-by-channel elementary streams stored in the memory are displayed on a screen of the mobile terminal.

In accordance with another aspect of exemplary embodiments of the present invention, there is provided an apparatus for receiving multiple streams in a mobile broadcast system, in which a demultiplexer receives and demultiplexes multiplexed logical channels on which data streams are transmitted from a service provider to a mobile terminal through a predetermined communication network, decoding buffers to which the demultiplexed logical channels are allocated by referring to a group session structure defined by the service provider, a single decoder computes a decoding time at which the single decoder sequentially accesses and decodes data of the decoding buffers by referring to the group session structure and performs a decoding operation at the computed decoding time, a memory stores decoded channel-by-channel elementary streams, and a compositor displays the stored decoded channel-by-channel elementary streams on a screen of the mobile terminal.

BRIEF DESCRIPTION OF THE DRAWINGS

The above and other objects, features and advantages of certain exemplary embodiments of the present invention will be more apparent from the following detailed description taken in conjunction with the accompanying drawings, in which.

Throughout the drawings, the same drawing reference numerals will be understood to refer to the same elements, features and structures.

DETAILED DESCRIPTION OF EXEMPLARY EMBODIMENTS

The matters defined in the description such as a detailed construction and elements are provided to assist in a comprehensive understanding of exemplary embodiments of the invention. Accordingly, those of ordinary skill in the art will recognize that various changes and modification of the embodiments described herein can be made without departing from the scope and spirit of the invention. Also, descriptions of well-known functions and constructions are omitted for clarity and conciseness.

In accordance with an exemplary embodiment of the present invention, multiple logical streams multiplexed into one physical stream are grouped. The grouped streams are defined in a session structure. According to information of the defined session structure, data of decoding buffers can be efficiently managed and decoded.

Figure 5A:
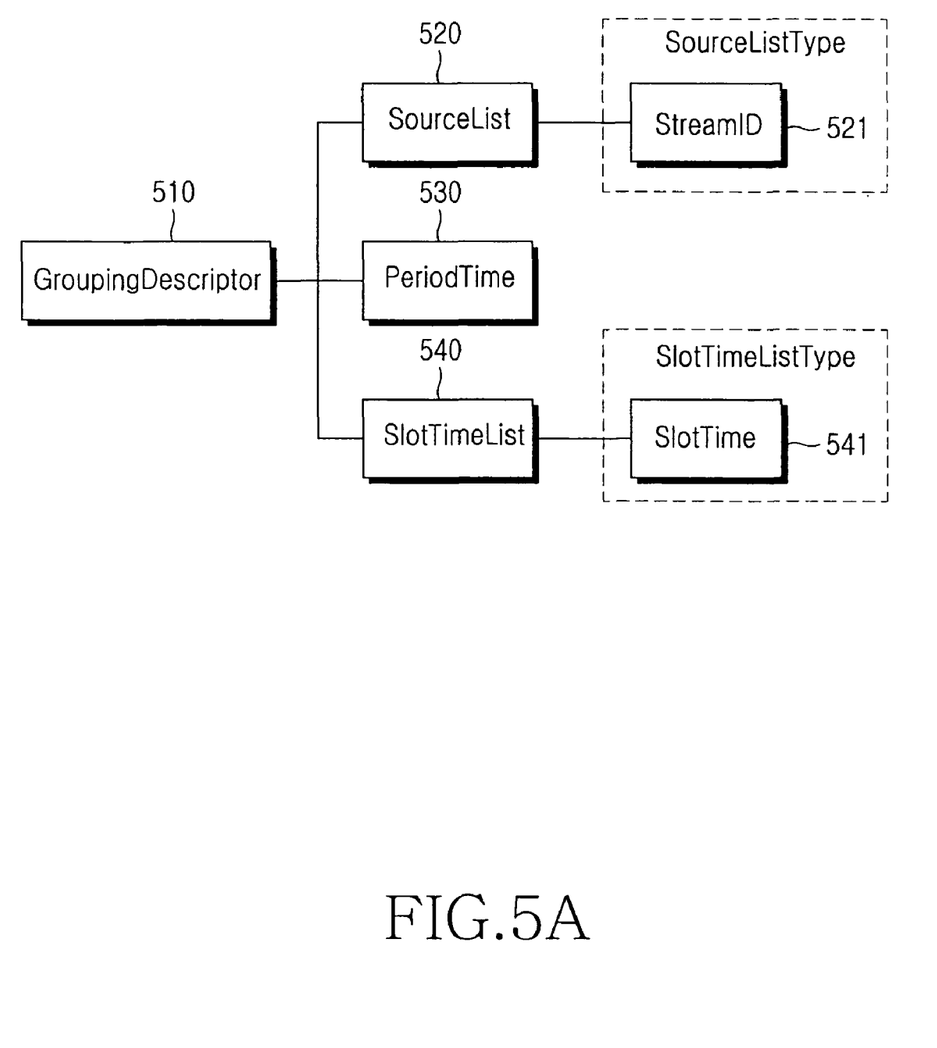
FIG. 5A illustrates a group description access unit (AU) structure in accordance with an exemplary embodiment of the present invention.

The session structure information is defined as shown in FIG. 5A and Table 1.

FIG. 5A illustrates a group description access unit (AU) structure in accordance with an exemplary embodiment of the present invention.

FIG. 5A illustrates a group description structure indicating a period in which an associated group is decoded and a decoding time allocated from a single decoder to each stream, when multiple logical streams of a session to be decoded by the decoder are grouped in one group in order to address problems occurring in the single decoder model as described with reference to FIGS. 3 and 4. The group description structure is defined by a service provider, that is, a broadcast server.

The group description AU structure (or GroupingDescriptor) 510 defined in accordance with an exemplary embodiment of the present invention is configured with SourceList 520, PeriodTime 530, and SlotTimeList 540 as illustrated in FIG. 5A.

SourceList 520 is a list of streams to be decoded by the single decoder. SourceListType is configured with a list of stream IDs 521 of elementary streams (ESs).

PeriodTime 530 is a period time required to decode each ES included in the source list once.

SlotTimeList 540 is a list of decoding times allocated to ESs. SlotTimeListType is configured with slot times 541.

Multiple logical streams multiplexed into one physical stream according to the group session structure are logically grouped in one group by referring to stream IDs. Stream-by-stream decoding slot times and a decoding period of a total group can be defined.

Figure 5B:
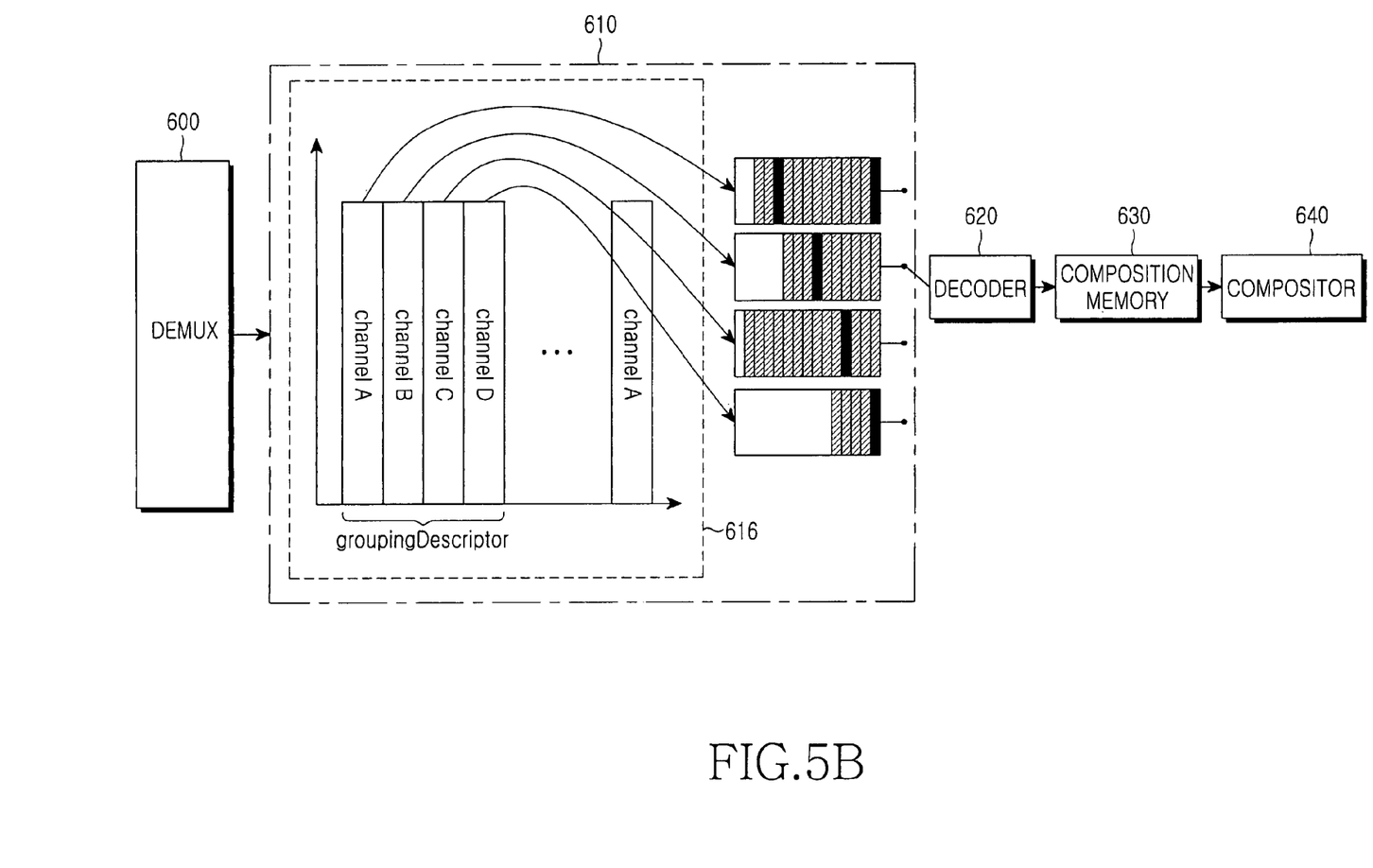
FIG. 5B is a block diagram illustrating a receiver in accordance with an exemplary embodiment of the present invention.

FIG. 5B is a block diagram illustrating a multi-stream receiver in accordance with an exemplary embodiment of the present invention.

A demultiplexer 600 receives and demultiplexes multiplexed logical channels on which data streams are transmitted from a service provider to a mobile terminal through a predetermined communication network. The demultiplexed channels are divided and stored in decoding buffers 610 and are decoded in a single decoder 620. In an exemplary embodiment of the present invention, a grouping descriptor structure is defined which is mapped to session structure information to propose how to allocate the demultiplexed channels to the decoding buffers 610. As indicated by reference numeral 616, multiple logical streams multiplexed into one physical stream according to the grouping descriptor structure are logically grouped in one group by referring to stream identifiers (IDs). The grouping descriptor structure will be described with reference to Table 1.

TABLE 1

| AU name | Element | Description |
| --- | --- | --- |
| GroupingDescriptor | Number of streams (number_of_element) | Number of streams to be decoded by the single decoder |
|  | StreamID | IDs of streams included in the source list |

Referring to Table 1, GroupingDescriptor is configured with the number of streams and stream IDs.

The number of streams is the number of streams to be decoded by the single decoder. The stream IDs are included in the source list.

A description of the applied grouping descriptor structure is as follows.

```
class groupingDescriptor {
    bit (8) number_of_element
    for (int i = 0; i < number_of_element; i++) {
        bit (12) streamID;
    }
}
```

The multiple logical streams multiplexed into one physical stream according to the grouping descriptor structure are logically grouped in one group by referring to the stream IDs. Stream-by-stream decoding slot times can be defined. Referring to the defined grouping descriptor, each of the decoding buffers 610 removes a frame thereof and adjusts a position by computing its decoding time. Thus, management is performed so that a delay time does not occur when the decoder 620 accesses the decoding buffers 610. The decoder 620 can compute the time at which each of the decoding buffers 610 is accessed by referring to slot times allocated on a stream-by-stream basis. A method for computing the decoding time for each of the decoding buffers 610 and the time at which the decoder 620 accesses each of the decoding buffers 610 will be described with reference to FIG. 6, FIGS. 7A and 7B.

Table 2 shows AU values of an AU table of a LASeR simple aggregation format (SAF), AU payload types, and payload data mapped thereto. As indicated by a shaded bar in Table 2, a value 0x08 is allocated to GroupingDescriptor in accordance with the present invention. In Table 2, values ranging from 0x00 to 0x07 have been proposed in the conventional LASeR technology. The value 0x08 is a reserved value in the prior art. However, in an exemplary embodiment of the present invention, the value 0x08 is allocated to GroupingDescriptor.

TABLE 2

| Value | Type of access unit payload | Data in payload |
| --- | --- | --- |
| 0x00 | Reserved | — |
| 0x01 | StreamHeader | A SimpleDecoderConfigDescriptor |
| 0x02 | StreamHeader (permanent[a]) | A SimpleDecoderConfigDescriptor |
| 0x03 | EndOfStream | (no data) |
| 0x04 | AccessUnit | An Access Unit |
| 0x05 | EndOfSAFSession | (no data) |
| 0x06 | CacheUnit | A cache object |
| 0x07 | RemoteStreamHeader | An url and a SimpleDecoderConfigDescriptor |
| 0x08 | GroupingDescriptor | A groupingDescriptor |
| 0x09~0x0F | Reserved | — |

Figure 6:
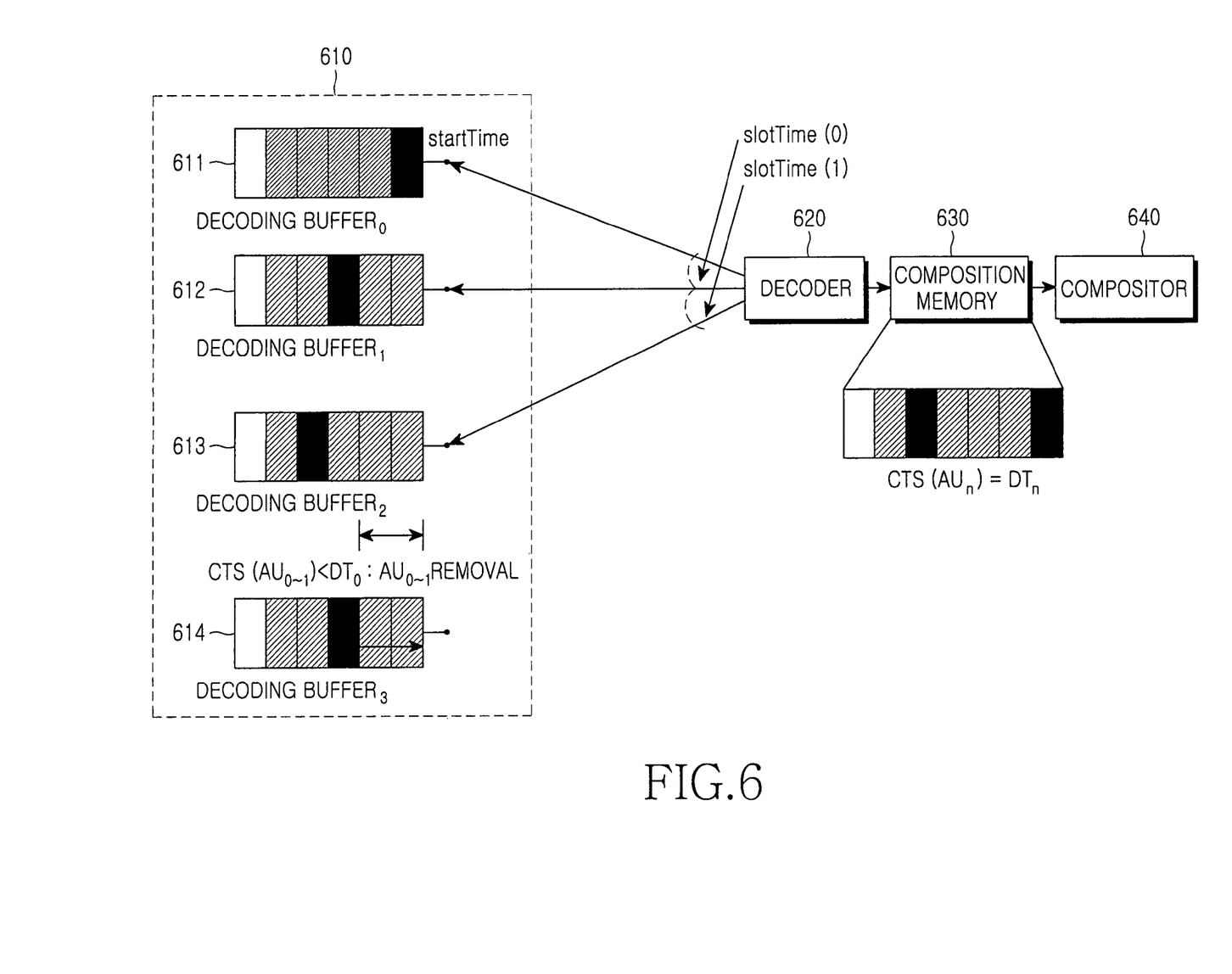
FIG. 6 illustrates an operation of a decoder in accordance with an exemplary embodiment of the present invention.

FIG. 6 illustrates a method for removing AUs from the decoding buffers or adjusting decoding positions by referring to the group description AU structure and the grouping descriptor structure of Table 1, and computing decoding times for the decoding buffers in accordance with an exemplary embodiment of the present invention.

In a method for computing the time at which an ES is decoded in each of the decoding buffers 610, the decoding time can be computed from information about a start time at which the first AU starts to be decoded, a period time 530 of a grouping description, and a slot time 540.

Because a decodable frame (indicated by a black box) in an associated stream of a first decoding buffer 611 of FIG. 6 is placed at a front end thereof, it can be immediately decoded. Because a decoding time is equal to the current time, the first decoding buffer 611 directly shifts a decodable AU to an access point.

Because a decodable frame (indicated by a black box) in an associated stream of a second decoding buffer 612 is placed in the third position from a front end thereof, it cannot be immediately decoded. In this case, a decoding time should be computed. A method for computing the decoding time is as follows.

A first decoding time is computed in the second decoding buffer 612. The first decoding time is computed as shown in Equation (1).

$$DT_0(S1) = \text{startTime} + \text{slotTime}(0) \quad \text{Equation (1)}$$

Herein, $DT_0$ is the first decoding time, startTime is the time at which the first AU starts to be decoded, slotTime is a decoding time allocated to each ES, and S1 is a stream.

After the first decoding time is computed, the second decoding buffer 612 computes the n-th decoding time corresponding to its decoding time. The n-th decoding time is computed as shown in Equation (2).

$$DT_n(S1) = DT_n + \text{periodTime} \quad \text{Equation (2)}$$

Herein, $DT_n$ is the n-th decoding time, $DT_{n-1}$ is the (n−1)-th decoding time, and periodTime is a period time required to decode each ES included in a source list once.

Because a decodable frame (indicated by a black box) in an associated stream of a third decoding buffer 613 is placed in the fourth position from a front end thereof, it cannot be immediately decoded. When an AU incapable of being immediately decoded at a decoding time is present among AUs of the third decoding buffer 613 (that is, $CTS(AU_{0-1}) < DT_0$), the third decoding buffer 613 removes the associated AUs ($AU_{0-1}$) even though a time designated by a composition time stamp (CTS) is not reached. Herein, the CTS refers to a time stamp indicating a time at which data is displayed on the mobile terminal. The CTS information is the basic information at the time of video coding. Thus, the mobile terminal can detect the CTS information at the decoding time.

Because a decodable frame (indicated by a black box) in an associated stream of a fourth decoding buffer 614 is placed in the third position from a front end thereof, it cannot be immediately decoded. Thus, at an associated decoding time (indicated by a black box), an AU with a smallest CTS value among buffer AUs is set to an AU to which random access can be performed. For this, $AU_{0-1}$ are removed from the fourth decoding buffer 614 of FIG. 6 and $AU_2$ is set to an access point.

Figure 7A:
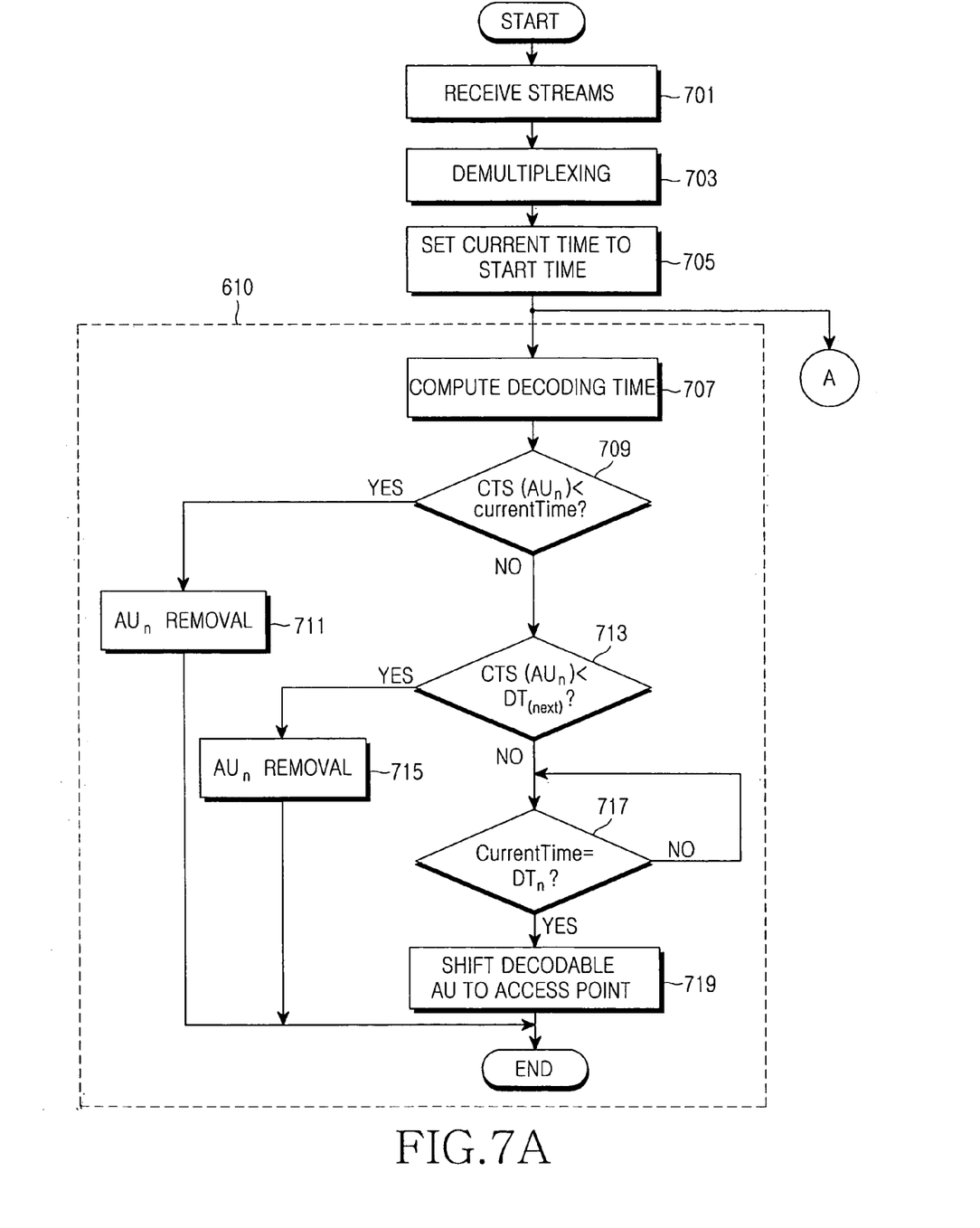
FIGS. 7A and 7B are flowcharts illustrating an operation of the receiver in accordance with an exemplary embodiment of the present invention.
Figure 7B:
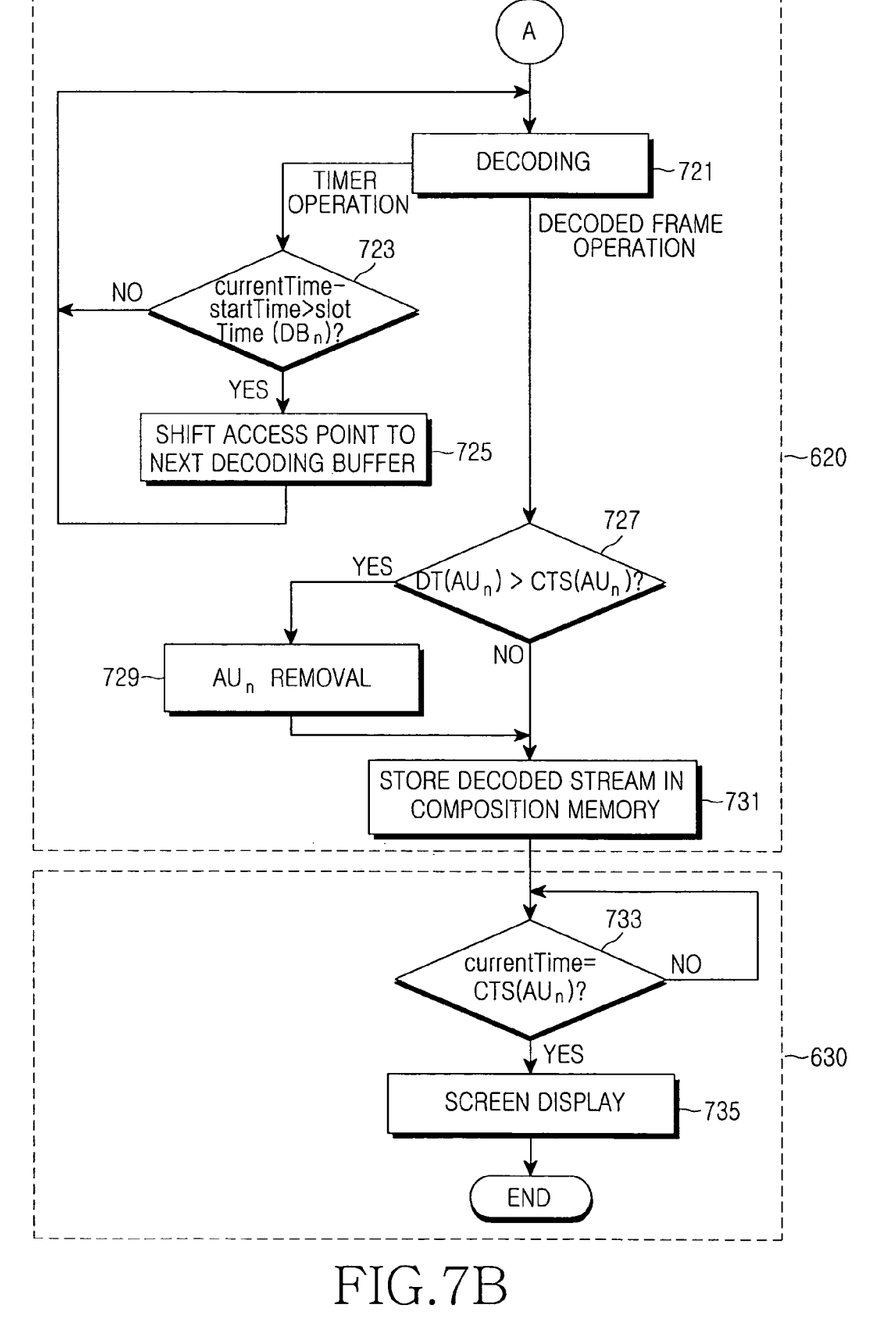

FIGS. 7A and 7B are flowcharts illustrating a multi-stream decoding method in accordance with an exemplary embodiment of the present invention.

Referring to FIG. 7A, a receiver receives media streams multiplexed into one physical channel in step 701. Then, the receiver separates the received multiplexed media streams into multiple logical channels through a demultiplexer, dynamically allocates the logical channels to the decoding buffers 610, and performs a waiting operation in step 703. When a decoder 620 starts a decoding operation, the receiver sets the current time to a decoding start time in step 705.

Next, the operations of the decoding buffers 610, the decoder 620, and a composition memory 630 will be described. First, the operation of the decoding buffers 610 will be described. In step 707, an associated decoding time is computed by referring to a start time corresponding to a first decoding time, a period time of a group description defined in an exemplary embodiment of the present invention, and a slot time. The first decoding time is computed as shown in Equation (1) and the associated decoding time is computed as shown in Equation (2).

The following operation is performed so that the decoding buffers 610 can set an AU with a smallest CTS value among buffer AUs to an AU to which random access can be performed after the decoding time is computed.

First, the decoding buffers 610 determine whether $CTS(AU_n)$ is less than the current time in step 709. If $CTS(AU_n)$ is less than the current time, the decoding buffers 610 remove $AU_n$ in step 711. However, if $CTS(AU_n)$ is equal to or more than the current time, the decoding buffers 610 determine whether $CTS(AU_n)$ is less than the next decoding time $DT_{next}$ in step 713. If $CTS(AU_n)$ is less than the next decoding time $DT_{next}$, the decoding buffers 610 remove $AU_n$ in step 715. However, if $CTS(AU_n)$ is equal to or more than the next decoding time $DT_{next}$, the decoding buffers 610 determine whether the current time is the associated decoding time $DT_n$ in step 717. If the current time is not the associated decoding time $DT_n$, step 717 is repeated. That is, until the associated decoding time $DT_n$ is reached, a waiting operation is performed in step 717. However, if the current time is the associated decoding time $DT_n$, the decoding buffers 610 directly shift a decodable AU to an access point in step 719.

On the other hand, when the current time is set to the decoding start time in step 705, the decoder 620 starts the decoding operation in step 721 as illustrated in FIG. 7B. Next, the decoding operation divided into a timer operation and a decoded frame operation will be described.

First, in the timer operation, the decoder 620 performs the decoding operation during a slot time of an associated stream in each of the decoding buffers 610. At this time, the decoder 620 determines whether a difference between the current time and the start time is more than the slot time in step 723. It should be noted that the subject of the determination can be the decoder 620 in accordance with an exemplary embodiment of the present invention or a controller (not illustrated). The difference between the current time and the start time is the progress time of decoding. If the difference between the current time and the start time is less than or equal to the slot time, the process returns to step 721. However, if the difference between the current time and the start time is more than the slot time, the decoding operation on the associated decoding buffer is stopped. Thus, the decoder 620 shifts the access point to the next decoding buffer in step 725. When the access point is shifted to the next decoding buffer, the decoder 620 performs the decoding operation during the slot time of the associated stream in the associated decoding buffer in step 721.

Next, the decoded frame operation of the decoder 620 will be described. In step 727, the decoder 620 determines whether an associated decoding time $DT(AU_n)$ is more than $CTS(AU_n)$. If the associated decoding time $DT(AU_n)$ is more than $CTS(AU_n)$, the decoder 620 proceeds to step 729 to remove $AU_n$ and stop the decoding operation. However, if the associated decoding time $DT(AU_n)$ is less than or equal to $CTS(AU_n)$, the decoder 620 stores a decoded stream in the composition memory 630 in step 731.

Next, the operation of the composition memory 630 will be described.

The composition memory 630 determines whether the current time is equal to $CTS(AU_n)$ in step 733. If the current time is not equal to $CTS(AU_n)$, step 733 is repeated. However, if the current time is equal to $CTS(AU_n)$, media stored in the composition memory 630 are displayed on the screen through a compositor 640 in step 735.

As is apparent from the above description, the exemplary embodiments of the present invention have the following effects.

Exemplary embodiments of the present invention can efficiently manage multiple decoding buffers by sequentially processing demultiplexed streams allocated to multiple decoding buffers in a single decoder when a mobile broadcast communication system based on LASeR multiplexes multiple logical media streams into one physical stream.

Moreover, exemplary embodiments of the present invention can efficiently manage decoding buffers by grouping multiple logical streams multiplexed into one physical stream and defining a session structure.

Moreover, exemplary embodiments of the present invention logically groups multiple logical streams multiplexed into one physical stream in one group according to a group session structure. In an exemplary implementation, stream-by-stream decoding slot times and a decoding period of a total group are defined for grouping description AUs. Each decoding buffer removes AUs therefrom and adjusts a position by referring to the grouping description AUs and computing a decoding time. The decoding buffers can be managed so that a delay time does not occur when the decoder accesses the decoding buffers.

In the exemplary embodiments of the present invention, the decoder can compute the time at which each decoding buffer is accessed by referring to slot times allocated on a stream-by-stream basis.

Moreover, the exemplary embodiments of the present invention can reduce a channel waste by proposing an operation of the decoder for configuring multiple channels according to session structure information without a special mosaic channel.

Moreover, the exemplary embodiments of the present invention can effectively reduce a delay time due to channel switching by addressing a problem occurring in multi-stream decoding in a mobile terminal for a mobile broadcast in which a single decoder and a single composition memory are provided.

While the invention has been shown and described with reference to certain exemplary embodiments thereof, it will be understood by those skilled in the art that various changes in form and details may be made therein without departing from the spirit and scope of the invention as defined by the appended claims and their equivalents.

What is claimed is:

1. A method for receiving multiple streams in a mobile broadcast system, the method comprising:
   receiving multiplexed logical channels on which data streams are transmitted from a service provider to a mobile terminal through a communication network;
   demultiplexing the multiplexed logical channels;
   decoding an elementary stream in each corresponding ones of the demultiplexed logical channels by a single decoder based on a group descriptor comprising a list of stream identifiers (IDs) identifying streams to be decoded in one group at a decoding time determined for each decoding buffer; and
   composing the decoded elementary streams of logical channels with a media.

2. The method of claim 1, wherein the group descriptor is included in an access unit payload.

3. The method of claim 1, wherein a first decoding time is determined using equation $DT0(S1)=startTime+slotTime(0)$ and a decoding time at which data of each decoding buffer is to be currently decoded is determined using equation $DTn(S1)=DTn-1+periodTime$, where $DT0$ is the first decoding time, startTime is a time at which a first access unit (AU) starts to be decoded, slotTime is a decoding time allocated to each elementary stream, $DTn$ is an n-th decoding time, $DTn-1$ is a (n−1)-th decoding time, periodTime is a period time required to decode each elementary stream included in a source list once, and S1 is a stream.

4. The method of claim 1, wherein when the time at which the single decoder accesses and decodes the data of the decoding buffers is determined, a time at which each decoding buffer is accessed is determined by referring to slot times allocated on a stream-by-stream basis.

5. The method of claim 1, wherein the service provider comprises a server of a broadcast provider.

6. An apparatus for receiving multiple streams in a mobile broadcast system, comprising:
   a receiver for receiving multiplexed logical channels on which data streams are transmitted from a service provider to a mobile terminal through a communication network;
   a demultiplexer for demultiplexing the multiplexed logical channels;
   a single decoder for decoding an elementary stream in each corresponding ones of the demultiplexed logical channels based on a group descriptor comprising a list of stream identifiers (IDs) identifying streams to be decoded in one group at a decoding time determined for each decoding buffer; and
   a composer for composing the decoded elementary streams of logical channels with a media.

7. The apparatus of claim 6, wherein the group descriptor is included in an access unit payload.

8. The apparatus of claim 6, wherein the controller determines a first decoding time using equation $DT0(S1)=startTime+slotTime(0)$ and determines a decoding time at which data of each decoding buffer is to be currently decoded using equation $DTn(S1)=DTn-1+periodTime$, where $DT0$ is the first decoding time, startTime is a time at which a first access unit (AU) starts to be decoded, slotTime is a decoding time allocated to each elementary stream, $DTn$ is an n-th decoding time, $DTn-1$ is a (n−1)-th decoding time, periodTime is a period time required to decode each elementary stream included in a source list once, and S1 is a stream.

9. The apparatus of claim 6, wherein when the time at which the single decoder accesses and decodes the data of the decoding buffers is determined, a time at which each decoding buffer is accessed is determined by referring to slot times allocated on a stream-by-stream basis.

10. The apparatus of claim 6, wherein the service provider comprises a server of a broadcast provider.

* * * * *